(12) United States Patent
Filpi et al.

(10) Patent No.: US 11,783,153 B2
(45) Date of Patent: Oct. 10, 2023

(54) CARD PACKAGING METHOD, CORRESPONDING PACKAGED CARD AND METHOD OF USE

(71) Applicant: STMicroelectronics S.r.l., Agrate Brianza (IT)

(72) Inventors: Giuliano Filpi, Caserta (IT); Antonio Montanino, Capua (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 105 days.

(21) Appl. No.: 17/408,176

(22) Filed: Aug. 20, 2021

(65) Prior Publication Data
US 2022/0067474 A1 Mar. 3, 2022

(30) Foreign Application Priority Data
Aug. 31, 2020 (IT) .................... 102020000020710

(51) Int. Cl.
G06K 19/06 (2006.01)
G06K 19/077 (2006.01)

(52) U.S. Cl.
CPC .................. *G06K 19/07722* (2013.01)

(58) Field of Classification Search
CPC ........... G06K 19/073; G06K 19/07726; G06K 19/07749; G06K 19/07722; G06F 1/18
USPC .................................................. 235/492, 487
See application file for complete search history.

(56) References Cited

U.S. PATENT DOCUMENTS

| | | | |
|---|---|---|---|
| 4,463,970 A * | 8/1984 | Kaule | B41M 3/144 427/7 |
| 5,941,375 A | 8/1999 | Kamens et al. | |
| 6,899,276 B2 * | 5/2005 | Limelette | G06K 19/07726 235/487 |
| 2006/0255154 A1 * | 11/2006 | Newbrough | A45C 11/182 235/380 |
| 2008/0116684 A1 * | 5/2008 | Galles | B42D 25/00 283/75 |
| 2016/0194129 A1 | 7/2016 | Lebovich | |
| 2018/0322378 A1 | 11/2018 | Khairallah et al. | |
| 2020/0018877 A1 | 1/2020 | Zhou et al. | |
| 2022/0067474 A1 | 3/2022 | Filpi et al. | |

FOREIGN PATENT DOCUMENTS

| | | |
|---|---|---|
| CN | 201442366 U | 4/2010 |
| CN | 104908471 A | 9/2015 |
| CN | 105046307 A | 11/2015 |

(Continued)

*Primary Examiner* — Daniel St Cyr
(74) *Attorney, Agent, or Firm* — Slater Matsil, LLP

(57) ABSTRACT

An exemplary package comprises a smart card having a first side and a second side, the first side comprising a first area having reproduced thereon first readable information and a second area having reproduced thereon second readable information. The first side having a laminar member applied so as to cover the first side, the laminar member comprising a light-impermeable material and a first light-permeable portion at the first side. The first readable information is visible through the first light-permeable portion and the second readable information is covered and made invisible by the light-impermeable material. A light-permeable film material is wrapped onto the smart card having the laminar member applied thereon.

20 Claims, 1 Drawing Sheet

(56) References Cited

FOREIGN PATENT DOCUMENTS

| | | | | |
|---|---|---|---|---|
| CN | 105849002 | A | 8/2016 | |
| CN | 206224559 | U | 6/2017 | |
| CN | 108430758 | A | 8/2018 | |
| CN | 108920006 | A | 11/2018 | |
| CN | 109102055 | A | 12/2018 | |
| CN | 216334043 | U | 4/2022 | |
| DE | 102006053471 | * | 5/2008 | ............. B65D 81/30 |
| DE | 102009011196 | * | 9/2010 | ............. B65D 75/34 |
| GB | 1424442 | A | 2/1976 | |

* cited by examiner

CARD PACKAGING METHOD, CORRESPONDING PACKAGED CARD AND METHOD OF USE

CROSS-REFERENCE TO RELATED APPLICATIONS

This application claims priority to Italian Patent Application No. 102020000020710, filed on Aug. 31, 2020, which application is hereby incorporated herein by reference.

TECHNICAL FIELD

The description relates to card packaging method, corresponding packaged card and method of use.

BACKGROUND

Existing packaging solutions for smart cards comprise transparent plastic film as a bag, a paper leaflet (sheet) and a scratch-off label to cover sensitive data (PIN/PUK codes, for instance).

This material is invariably intended to be disposed of. In view of the large number of items involved, this has a major impact on the environment and also generates essentially useless cost.

SUMMARY

An exemplary method of packaging a smart card having a first side and a second side includes applying a laminar member onto the smart card to cover the first side. The first side comprises a first area having reproduced thereon first readable information and a second area having reproduced thereon second readable information. The laminar member comprises a light-impermeable material and a first light-permeable portion at the first side. The first readable information is visible through the first light-permeable portion and the second readable information is covered and made invisible by the light-impermeable material. The method includes wrapping the smart card having the laminar member applied thereon with a light-permeable film material.

An exemplary package comprises a smart card having a first side and a second side, the first side comprising a first area having reproduced thereon first readable information and a second area having reproduced thereon second readable information. The first side having a laminar member applied so as to cover the first side, the laminar member comprising a light-impermeable material and a first light-permeable portion at the first side. The first readable information is visible through the first light-permeable portion and the second readable information is covered and made invisible by the light-impermeable material. A light-permeable film material is wrapped onto the smart card having the laminar member applied thereon.

BRIEF DESCRIPTION OF THE DRAWINGS

The features and advantages of embodiments will become apparent from the following detailed description of practical implementations thereof, shown by way of non-limiting example in the accompanying figures, wherein.

DETAILED DESCRIPTION OF ILLUSTRATIVE EMBODIMENTS

Figure 1:
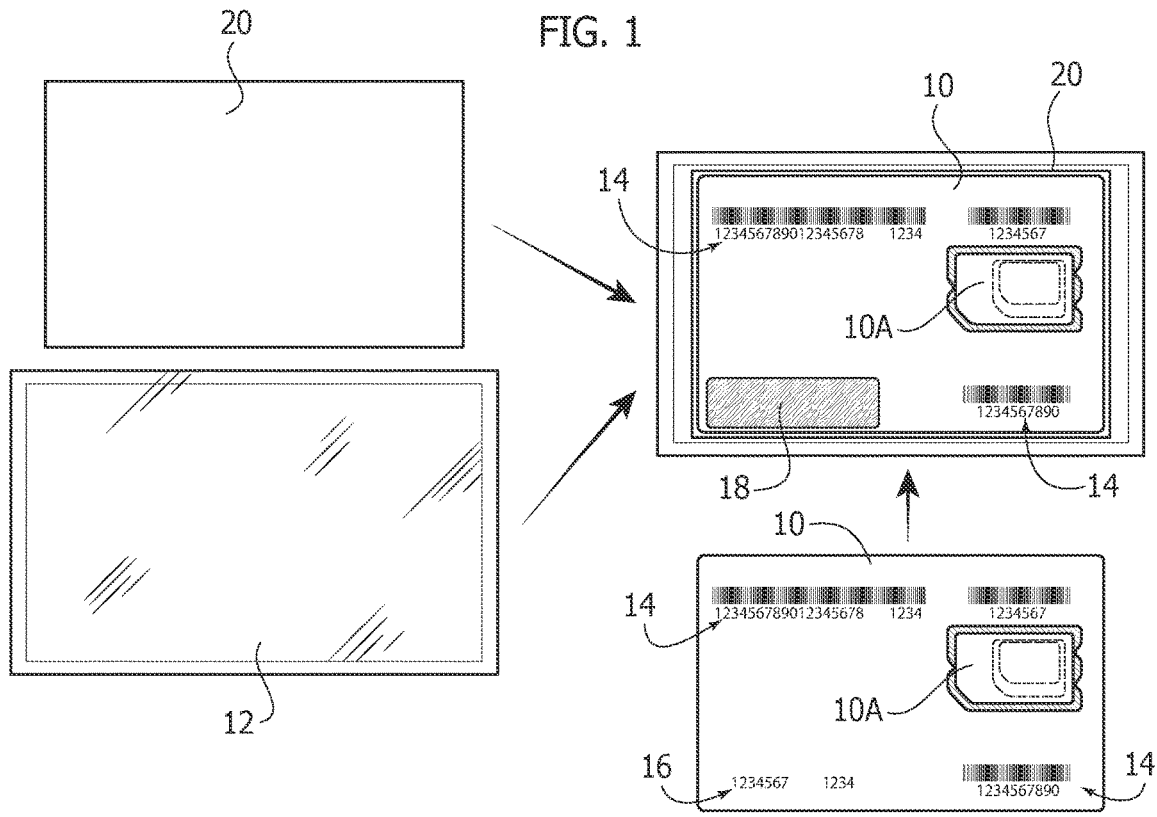
FIG. 1 is an exemplary representation of current packaging used for cards such as SIM cards.

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Moreover, particular conformations, structures, or characteristics may be combined in any adequate way in one or more embodiments.

The headings/references used herein are only provided for convenience and hence do not define the sphere of protection or the scope of the embodiments.

Embodiments relate to packaging cards such as "smart" cards. One or more embodiments may be applied, for instance, to packaging SIM (Subscriber Identity Module) cards as currently used in mobile phones such as smart phones and similar user equipment in mobile communications.

More environment-friendly (ecological) and less expensive solutions for card packaging are thus desirable. One or more embodiments contribute in providing such a solution. One or more embodiments may concern a related packaged card. One or more embodiments may concern a related method of use.

While a SIM card is referred to as exemplary of such a smart card, the embodiments are not limited to such a prospected use. One or more embodiments may be applied to other types of cards such as, just to mention a few possible examples, credit cards, personal identity cards, access control cards, pay TV subscriber cards, travel cards and the like and/or to different smart cards formats such as ID-1, Half ID-1 and quarter ID-1.

The claims form an integral part of the technical teaching of the description provided herein.

One or more embodiments may contemplate using FSC or recycled paper to cover sensitive data in a compostable wrapping bag.

One or more embodiments may facilitate avoiding scratch-off labels (and use of adhesives such as permanent adhesive polyesters) and/or facilitate using "bio" films to replace a transparent bag.

This may result in reduced impact on the environment and reduced costs.

By way of introduction to a detailed description of illustrative embodiments, certain acronyms/designations used herein will be briefly discussed.

FSC: Forest Stewardship Council is an organization that sets specifications/guidelines for environment-friendly and socially-beneficial forestry. Labeling a product as "FSC Certified" indicates that the product was produced in a way respectful of factors such as biological diversity, the quality of life of people and workers and sustaining economic viability.

Recycled/recycling indicates processes aiming at recovering waste material in view of the production of new products.

Compostable/compostability indicates that a certain product or substance is comprised of decaying biodegradable materials which may possibly transform into nutrient material.

Standards such as the European Norm EN 13432 "Requirements for packaging recoverable through composting and biodegradation—Test scheme and evaluation criteria for the final acceptance of packaging", sets forth characteristics of a compostable material:

Biodegradability, i.e., the metabolic conversion of the compostable material into carbon dioxide. This property is measured with a standard testing method, namely prEN 14046 (also published as ISO 14855: biodegradability under controlled composting conditions). The level of acceptance is 90% biodegradability (with respect to cellulose) to be achieved in less than 6 months.

Disintegrability, i.e., the fragmentation and loss of visibility in the final compost (absence of visual contamination). Measured with a composting test on a pilot scale (prEN 14045). Samples of the test material are composted together with organic waste for 3 months. At the end, the compost is sifted with a 2-mm sieve. The mass of residue of the test material with a size greater than 2 mm must be less than 10% of the initial mass.

Absence of adverse effects on the composting process, verified with a composting test on a pilot scale.

Low levels of heavy metals (below predefined maximum values) and absence of adverse effects on the quality of the compost (e.g., reduction of the agronomic value and presence of ecotoxicological effects on plant growth). A plant-growth test (test OECD 208, modified) is carried out on samples of compost where degradation of the test material has occurred. No difference must be observed as compared to control compost.

Other chemico-physical parameters that must not change after degradation of the material under study: pH; saline content; volatile solids; N; P; Mg; K.

It is noted that a biodegradable material is not necessarily compostable because it must also disintegrate during a composting cycle. On the other hand, a material that during a composting cycle breaks up into microscopic pieces that are not then, however, totally biodegradable is not compostable.

UNI EN 13432 is a harmonized norm; i.e., it has been published in the Official Journal of the European Union and is adopted in Europe at a national level and envisages presumption of compliance with the European Directive No. 94/62 EC, on packages and package waste.

FIG. 1 is an exemplary representation of a conventional solution for packaging smart cards, generally designated 10.

In the exemplary case considered herein, the card 10 is a SIM card which includes an insert 10A intended to be separated from the rest of the card—for instance, by breaking thin support bridges formed in the card body, usually of a light plastics material—and inserted into a mobile phone such as a smart phone or similar user equipment in mobile communications.

In that way, a semiconductor chip or die (an integrated circuit or IC, for instance) carried by the insert 10A can provide a Subscriber Identity Module (SIM) for the equipment.

Such SIM cards are conventional in the art, which makes it unnecessary to provide a more detailed description herein.

It will be otherwise appreciated that such implementation details per se are not of specific momentum for the embodiments.

In a conventional solution as exemplified in FIG. 1, the card 10 (of an optionally rectangular shape) is individually wrapped in a transparent plastic film (a plastic bag 12 of the flow-pack type, capable of receiving the card 10 therein, for instance) in view of delivery to a user (client or subscriber, for instance).

The (plastic) body of a card such as 10 may carry reproduced thereon (for instance printed of the back side) information expected to be visible and readable.

For instance, in the case of a SIM card, such information may include a SIM card serial number either in barcode and human-readable form to ease logistics/activations at point of sales and other information as indicated at 14 in FIG. 1.

The body of a card such as 10 may also carry (for instance printed of the back side) some readable information which is not expected to be visible immediately.

For instance, in the case of a SIM card this "sensitive" information may include PIN and PUK values as indicated at 16 in FIG. 1.

These data are covered with a scratch-off layer 18 intended to be removed by the final user after being delivered the card 10.

A paper leaflet 20 may be provided to cover and protect the front side of the card 10. The leaflet 20 is inserted with the card in the bag 12.

The number of SIM cards per year currently packed as illustrated in FIG. 1 can be estimated in the scale of millions and the resulting impact of disposable packaging as discussed above on the environment cannot be underestimated.

Attempts have been made to reduce the quantity of plastics material involved (by reducing the SIM body size, for instance). Reducing other potentially polluting materials deriving from the packaging still attracts attention. It is otherwise noted that such a desired reduction should not detract from the reliability of card packaging and/or result in undesirably increases costs.

Figure 2:
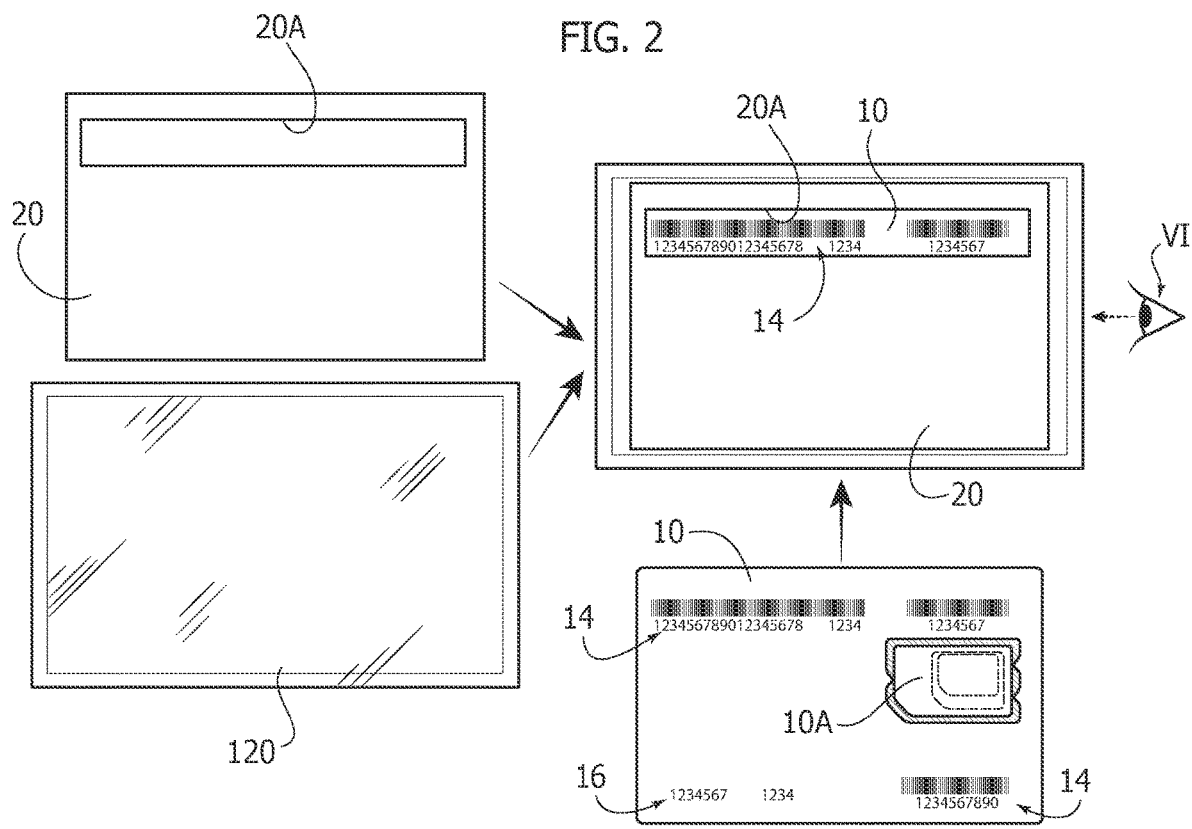
FIG. 2 is an exemplary representation of packaging according to embodiments of the present description.

FIG. 2 is exemplary of embodiments of a package for a card 10 where a scratch-off layer (18 in FIG. 1) is no longer used.

A SIM card will be again considered as exemplary of such a card. For that reason, in FIG. 2, parts or elements like parts or elements as already discussed in connection with FIG. 1 are indicated with like reference symbols. A corresponding detailed description will not be repeated for brevity.

A leaflet 20 (thin cardboard, for instance) may be again provided to cover and protect the card 10 at the back side where the information 14 and 16 is reproduced.

The leaflet 20 comprises light-impermeable material (that is, opaque or non-transparent material) which can adequately cover and mask from sight the "sensitive" information 16 (PIN/PUK information, for instance) avoiding, for instance, using about 0.2 mg of permanent adhesive polyester for a scratch-off label.

Visibility of at least part of the information 14 (SIM card serial number to ease logistics/activations at point of sales, for instance) is still facilitated by providing in the leaflet 20 one or more light-permeable portions (window portions 20A, for instance) at the location(s) where the information intended to be directly visible is reproduced.

The leaflet 20 may comprise paper such as cellulose paper, e.g. recycled (or FSC certified) paper.

The leaflet 20 may comprise biodegradable or recyclable polymers, possibly as combined films (biodegradable or recyclable polymers+paper).

The window portion(s) 20A facilitate accessing the SIM serial number or similar information 14 as desired to allow handling and logistics at the point of sales. Also, the opacity of the leaflet 20 securely protects the sensitive information 16 without resorting to a scratch-off label anymore.

Plural windows 20A and/or windows having shapes different from the rectangular window illustrated herein by way of example can be adopted in order to facilitate access to (at least part of) information 14 as desired.

As illustrated in FIG. 2, a light-permeable (clear or transparent) wrapping film (wrapping 120) can be used to provide a (optionally sealed) bag for insertion of the card 10 and the leaflet 20 which covers the (backside of the) card 10: leaving the information 14 at least partly available for visual inspection VI through the window(s) 20A as desired, for instance, for logistics/activations at point of sales, and concealing the "sensitive" information 16 from visual inspection VI as long as the leaflet 20 is left in place.

In that way, "sensitive" information 16 can be accessed and read only after the card 10 plus the leaflet 20 are released from the wrapping 120 (a sealed envelope, for instance, which may be torn open by the user) and the leaflet 20 removed from the card 10.

A compostable light-permeable (clear or transparent) material such as "bio" films (for instance cellulose films or bio-polymer films such poly-lactic acid based or corn starch based films) or recyclable films (polypropylene, for instance) can be selected for the wrapping film of the bag (wrapping 120).

One or more embodiments thus provide a wrapping package for smart cards having reduced impact on the environment thus reducing pollution coming from SIM cards packaging.

One or more embodiments may facilitate reducing polluting material, thus producing eco-friendly, cost-effective packaging for smart card such as SIM cards.

A method as exemplified herein is applicable to packaging a smart card (for instance, a SIM card 10) having a first (front) side and a second (back) side, at least one of said first and second sides (the back side, for instance) comprising at least one first area having reproduced thereon first readable information (for instance, 14) and at least one second area having reproduced thereon second readable information (for instance, 16).

A method as exemplified herein may comprise: applying a laminar (sheet-like) member (for instance, leaflet 20) onto the smart card to cover said at least one of said first and second sides, wherein the laminar member comprises light-impermeable material and has at least one light-permeable portion (for instance, 20A) formed therein at said at least one first area, wherein said first readable information is visible through said at least one light-permeable portion of the laminar member and said second readable information is covered and made invisible by the light-impermeable material of the laminar member, wrapping the smart card having said laminar member (removably) applied thereon with light-permeable film material (for instance, 120).

In a method as exemplified herein, wrapping the smart card having said laminar member applied thereon with light-permeable film material may comprise: forming a bag or envelope comprising light-permeable film material, and inserting the smart card having said laminar member applied thereon into said bag or envelope.

In a method as exemplified herein, said light-impermeable material may be selected out of paper, biodegradable or recyclable polymers, and combinations thereof (for instance, combined films of biodegradable or recyclable polymers+ paper).

In a method as exemplified herein, said light-impermeable material may comprise recycled or FSC certified paper.

In a method as exemplified herein, said light-permeable film material may be selected out of compostable films and recyclable films.

In a method as exemplified herein, said light-permeable film material may be selected out of: cellulose films, poly-lactic acid based or corn starch based films, polypropylene films.

A package as exemplified herein may comprise: a smart card having a first (front) side and a second (back) side, at least one of said first and second sides (the back side, for instance), comprising at least one first area having reproduced thereon first readable information and at least one second area having reproduced thereon second readable information, a laminar member applied onto the smart card to cover said at least one of said first and second sides, wherein the laminar member comprises light-impermeable material and has at least one light-permeable portion formed therein at said at least one first area, wherein said first readable information is visible through said at least one light-permeable portion of the laminar member and said second readable information is covered and made invisible by the light-impermeable material of the laminar member, light-permeable film material wrapped onto the smart card having said laminar member applied thereon.

In a package as exemplified herein, said light-permeable film material wrapped onto the smart card having said laminar member applied thereon may comprise a bag or envelope of light-permeable film material having the smart card with said laminar member applied thereon inserted into said bag or envelope.

In a package as exemplified herein, said bag or envelope may be a sealed bag or envelope having the smart card with said laminar member applied thereon sealingly inserted into said bag or envelope.

A method of using a package as exemplified herein may comprise visually reading (see, for instance VI in FIG. 2) said first readable information visible through said at least one light-permeable portion of the laminar member and the light-permeable film material wrapped onto the smart card having said laminar member applied thereon while refraining from removing the laminar member applied onto the smart card.

In that way such logistics/activations can be performed without accessing the "sensitive" information which can be securely accessed by the (final) user only after opening the package (tearing a sealed envelope for instance) and removing the laminar member applied onto the smart card.

Without prejudice to the underlying principles, the details of construction and the embodiments may vary widely with respect to what has been described and illustrated herein purely by way of example, without thereby departing from the scope of the embodiments.

The extent of protection is determined by the annexed claims.

What is claimed is:

1. A method of packaging a smart card having a first side and a second side, the method comprising:
   having a smart card comprising an insert containing a semiconductor die, the insert being configured to be separated from the smart card;
   applying a laminar member onto the smart card to cover the first side, the laminar member being made a first biodegradable material, the first side of the smart card comprising a first area having reproduced thereon first readable information and a second area having reproduced thereon second readable information, the laminar member comprising a light-impermeable material and a first light-permeable portion at the first side, the first readable information being visible through the first light-permeable portion and the second readable information being covered and made invisible by the light-impermeable material; and forming a packaged smart card by wrapping the smart card having the laminar member applied thereon with a light-permeable film material, the light-permeable film material being made of a second biodegradable material, the first readable information on the first side of the smart card being visible from outside of the packaged smart card and the second readable information on the first side of the smart card being made invisible from the outside of the packaged smart card by the light-impermeable material of the laminar member.

2. The method of claim 1, wherein wrapping the smart card comprises:
forming a bag or envelope comprising the light-permeable film material, and
inserting the smart card having the laminar member applied thereon into the bag or envelope.

3. The method of claim 1, wherein the light-impermeable material is selected out of paper, biodegradable or recyclable polymers, and combinations thereof.

4. The method of claim 1, wherein the light-impermeable material comprises recycled paper.

5. The method of claim 1, wherein the light-impermeable material comprises Forest Stewardship Council (FSC) certified paper.

6. The method of claim 1, wherein the light-impermeable film material is selected out of compostable films and recyclable films.

7. The method of claim 1, wherein the light-permeable film material is selected out of:
cellulose films,
poly-lactic acid based or corn starch based films,
polypropylene films.

8. The method of claim 1, wherein the first side comprises a third area having reproduced thereon third readable information, the laminar member further comprising a second light-permeable portion at the first side, the third readable information being visible through the second light-permeable portion.

9. The method of claim 1, wherein the applying the laminar member covers the second side, the second side comprising a third area having reproduced thereon third readable information, the laminar member further comprising a second light-permeable portion at the second side, the third readable information being visible through the second light-permeable portion.

10. The method of claim 9, wherein the second side comprises a fourth area having reproduced thereon fourth readable information, and wherein the fourth readable information is covered and made invisible by the light-impermeable material.

11. A package comprising:
a smart card having a first side and a second side, the first side comprising a first area having reproduced thereon first readable information and a second area having reproduced thereon second readable information, the smart card comprising an insert containing a semiconductor die, the insert being configured to be separated from the smart card, a laminar member covering the first side, the laminar member being made a first biodegradable material, the laminar member comprising a light-impermeable material and a first light-permeable portion at the first side of the smart card, the first readable information being visible through the first light-permeable portion and the second readable information being covered and made invisible by the light-impermeable material; and a light-permeable film material wrapped onto the smart card having the laminar member applied thereon, the light-permeable film material being made of a second biodegradable material, the first readable information on the first side of the smart card being visible from outside of the package and the second readable information on the first side of the smart card being made invisible from the outside of the package by the light-impermeable material of the laminar member.

12. The package of claim 11, wherein the light-permeable film material comprises a bag or envelope of light-permeable film material having the smart card with the laminar member applied thereon inserted into the bag or envelope.

13. The package of claim 12, wherein the bag or envelope is a sealed bag or envelope having the smart card with the laminar member applied thereon sealingly inserted into the bag or envelope.

14. The package of claim 11, wherein the first side comprises a third area having reproduced thereon third readable information, the laminar member further comprising a second light-permeable portion at the first side, the third readable information being visible through the second light-permeable portion.

15. The package of claim 11, wherein the laminar member covers the second side, the second side comprising a third area having reproduced thereon third readable information, the laminar member further comprising a second light-permeable portion, the third readable information being visible through the second light-permeable portion.

16. The package of claim 15, wherein the laminar member covers the second side, the second side comprising a fourth area having reproduced thereon fourth readable information, the fourth readable information being covered and made invisible by the light-impermeable material.

17. A method of using a package, the method comprising:
having a smart card with a first side and a second side, the smart card comprising an insert containing a semiconductor die, the insert being configured to be separated from the smart card, the first side comprising a first area having reproduced thereon first readable information and a second area having reproduced thereon second readable information, the first readable information being visible through a light-permeable portion and the second readable information being covered and made invisible by a light-impermeable material; and visually reading the first readable information visible through the light-permeable portion of a laminar member covering the first side, the laminar member being made a first biodegradable material, the laminar member comprising the light-impermeable material and the light-permeable portion at the first side, and the light-permeable film material being wrapped onto the smart card having the laminar member applied thereon while refraining from removing the laminar member from the first side, the light-permeable film material being made of a second biodegradable material, the first readable information on the first side of the smart card being visible from outside of the package and the second readable information on the first side of the smart card being made invisible from the outside of the package by the light-impermeable material of the laminar member.

18. The method of claim 17, further comprising
inserting the smart card having the laminar member applied thereon into a bag or envelope to wrap the light-permeable film material onto the smart card.

19. The method of claim 17, wherein the light-impermeable material comprises paper, or biodegradable or recyclable polymer.

20. The method of claim 19, wherein the light-impermeable material comprises paper and biodegradable or recyclable polymer.

\* \* \* \* \*